United States Patent [19]

Bridges et al.

[11] Patent Number: 4,811,107
[45] Date of Patent: Mar. 7, 1989

[54] VIDEO PLAYER SENSOR CABLE

[75] Inventors: Mark E. Bridges, Spencerport; Robert W. Easterly, Churchville, both of N.Y.

[73] Assignee: Eastman Kodak Company, Rochester, N.Y.

[21] Appl. No.: 143,657

[22] Filed: Jan. 13, 1988

[51] Int. Cl.$^4$ ............................................. H04N 3/36
[52] U.S. Cl. ...................................... 358/214; 358/229
[58] Field of Search ........... 358/214, 215, 216, 213.11, 358/213.13, 229

[56] References Cited

U.S. PATENT DOCUMENTS 4,231,062 10/1980 Stewich .......................... 358/213.13
4,331,979 5/1982 Bendell ................................ 358/214

Primary Examiner—Jin F. Ng
Assistant Examiner—Stephen Brinich
Attorney, Agent, or Firm—Robert H. Sproule

[57] ABSTRACT

Film video player apparatus (11) having an optical axis (A), a signal processing board (14) displaced from the optical axis, a video sensor (S) proximate to but spaced from the signal processing board and movable axially, translationally and rotationally relative to the optical axis and movable relative to the signal processing board, and a flexible cable (10) connected to the signal processing board and the video sensor and being coiled at least partially circumferentially about the video sensor for movement with the video sensor means without producing a failure by flexure thereof. The flexible cable (10) has a plurality of signal carrying lines (90) interposed between a pair of ground planes (94, 95), the ground planes including longitudinal strips (100, 101) with longitudinally spaced cross bars (102), the cross bars of one of the pair of ground planes being longitudinally offset with respect to the cross bars of the other of the pair of ground planes to minimize variations in bending resistance longitudinally of the flexible cable.

18 Claims, 4 Drawing Sheets

VIDEO PLAYER SENSOR CABLE

CROSS REFERENCE TO RELATED APPLICATION

U.S. application Ser. No. 143,661 for "FILM VIDEO PLAYER APPARATUS", filed of even date.

TECHNICAL FIELD

The present invention relates generally to a video player having a sensor for generating a video signal from an optical image which is interconnected with processing circuitry mounted on the chassis of the video player by a cable. More particularly, the invention relates to a video player having a sensor which is movable in a plurality of directions and orientations for generating a selectively composed video signal and having a flexible cable interconnecting the sensor to a relatively fixed portion of the video player processing circuitry mounted on the chassis for transmitting timing, video, and power signals between the sensor and signal processing means of the video player.

BACKGROUND ART

Apparatus for sensing various types of photographic color films and for converting an image into a video signal are well known in the art. With the development of relatively low cost, reliable solid state image sensor there has been increasing interest in the development of devices such as film video players for displaying film images such as those present on color slides or color negatives on television monitors and receivers. With the availability of such sensors there has arisen an interest in composing a video image corresponding to only a portion of a film image and for displaying or recording such a video image.

A primary reason for the interest in composing selected video images constituting a portion of a film image is that the resolution of the commonly used photographic film formats is substantially greater than standard television resolution by factors of approximately four to ten times. As will be appreciated, the full available resolution of these film formats is not effectively used at normal magnification where the full frame film image substantially fills the solid state image sensor so that the video image effectively just fills the display of the television monitor or receiver. The excess resolution available in these film formats can be advantageously utilized by providing a film video player with means such as zoom optics for selectively changing the magnification of the video image and thus the displayed image with respect to the film image. Since in its magnified form the video image and resultant display constitutes only a portion of film frame image, it is desirable to be able to effect relative vertical and horizontal translation between the film image and the video image. More advanced composing or editing functions can be carried out where it is possible to effect relative rotation between the film image and the video image.

A common approach in the design of film video players of this type contemplates the use of fixed apparatus for mounting a slide or film negative presenting a film image and a fixed sensor spaced a distance therefrom along the optical axis of the system. Interposed between the fixed film image and fixed sensor is a multi-group variable focal length lens wherein one of the lens elements is movable axially along the optical axis to vary the focal length of the lens and thus provide a zoom capability. Multi-group variable focal length lenses of this type suffer the disadvantage that they are relatively expensive. Such multi-group variable focal length lenses also have additional manufacturing and assembly disadvantages when incorporated into a video player.

U.S. application Ser. No. 143,661 for "Film Video Player Apparatus", filed of even date, proposes a film video player employing a fixed focal length lens. The disclosed system creates a selectively composed video signal from a photographic film image by moving the lens and sensor axially of the optical axis of the system, by translating the sensor in two perpendicular directions relative to the film frame image, and by rotating the sensor relative to the film frame image. A problem arising in such a system involves the necessity for maintaining various wiring interconnections between the sensor and related signal processing means for transmitting timing, video and power signals between the sensor and signal processing means mounted on a relatively fixed portion of the chassis of the video player at all times. Thus, there is need for a multi-signal flexible cable capable of maintaining an interconnection between a sensor and video player chassis during movement of the sensor axially, translationally and rotationally relative to the optical axis of the video player with attendant motion relative to the signal processing means.

It is known in the electrical arts to employ a coiled cable between concentric cylindrical members of different sizes in lieu of wiper contacts or rings which may be subject to damage or operating failures after extended operating periods. In this respect, ribbon cable is wound in a plurality of circumferential revolutions in the area between the outside diameter of the interior cylindrical member and the inside diameter of the outer cylindrical member. Such devices do not, however, contemplate and would not permit substantial axial or translator motion between the cylindrical members.

It is also known in the art to employ flexible printed circuit interconnecting cable to join two sections of collapsible camera configurations in such a manner as to effect flex of the cable in a gradual manner over an extended length of the cable to accommodate pivotal motion between the camera sections without overflexing the printed circuit cable. Additionally, it is known to employ a flexible circuit interconnecting cable wherein flexure is achieved in a plurality of planes by cutting the substrate longitudinally between conductors and thereafter twisting opposed end segments of the assembly to achieve a plurality of helical turns in the cable to provide flexural planes for desired relative motion between the two ends of the cable. Such flexible cable wherein the substrate is cut longitudinally between conductors may advantageously be provided with a sleeve of flexible material for mechanical protection and constraint.

In the use of flexible cables wherein signal carrying lines are bounded by conductive ground planes to reduce the effects of spurious signals or noise, it is commonly necessary to effect impedance matching between the flexible cable and a member interconnecting therewith, such as for example in the video apparatus arts a standard 75 ohm coaxial cable. Normally, a signal carrier would have a cross-sectional area in relation to the cross-sectional area of the ground planes which would produce a lesser impedance than such a coaxial cable connection. A conventional method to achieve impedance matching contemplates a reduction of the cross-sectional area of the signal carriers relative to the ground planes. In an application of this nature, however, reduction in cross-sectional area of the signal carrier would tend to reduce its area to an extent that its elastic limit might be exceeded or it would be subject to fatigue failure upon repeated flexing if the cross-sectional area of the signal carrier were reduced. Thus, a problem is presented in employing prior art teachings wherein it is necessary to effect axial, translational and rotational motion of one of two members connected by a flexible cable while achieving desired impedance matching characteristics with an interconnected coaxial cable without reducing the physical characteristics of the signal carrying members to an extent that they may be prone to mechanical failure upon the requisite flexing of the cable.

DISCLOSURE OF THE INVENTION

Therefore, an object of the present invention is to provide a sensor cable for a film video player which is capable of interconnecting relatively fixed signal processing means on the video player chassis with a sensor which is axially translationally and rotationally movable with respect to the optical axis of the video player. Another object of the present invention is to provide a flexible cable which interconnects relatively fixed signal processing means with a movable sensor which is proximate to but spatially displaced from the signal processing means. Yet another object of the present invention is to provide a flexible cable configuration which permits a highly compact design with respect to disposition of the signal processing means in relation to the movable sensor.

Another object of the present invention is to provide a flexible cable for a video player wherein the flexible cable is circumferentially disposed about at least a portion of the periphery of the sensor. Yet another object of the present invention is to provide a flexible cable which is coiled and uncoiled about the sensor during some of the motions of the sensor; the cable is formed into a helix having differing helix angles during other motions of the sensor; and the cable is variously flexed during motions of the sensor within the failure limits of the flexible cable. Still another object of the present invention is to provide a flexible cable which moves within design constraints which do not exceed the elastic limit of the cable components nor with repeated flexures effect a fatigue failure upon the cable components.

Yet another object of the present invention is to provide a flexible cable which can accommodate substantial variations in the position of the sensor relative to the fixed signal processing means to which one extremity of the cable is attached. Yet another object of the present invention is to provide a flexible cable which accommodates substantial relative movement of the sensor without the necessity for longitudinally slitting the cable between the conductors thereof such as to mechanically and electrically alter the characteristics of the flexible cable. Another object of the present invention is to provide a flexible cable which can accommodate such sensor motion without the necessity for twisting the cable or providing an enclosing sleeve or other mechanical reinforcement therefor.

Yet another object of the present invention is to provide a flexible cable having a combination of signal carrying lines bounded by suitable conductive ground planes to reduce the effects of spurious signals or noise. Still a further object of the invention is to provide a flexible cable having signal carriers which are of sufficient cross-sectional areas to possess good signal transmission characteristics and a cross-sectional size and configuration such as to resist failure when subjected to repeated flexure or bending. A still further object of the invention is to provide a flexible cable wherein the cross-sectional area of the ground planes may be systematically reduced to effect impedance matching with interconnecting members without reducing the cross-sectional area of the signal carriers or otherwise degrading electrical or mechanical characteristics of the flexible cable.

Yet another object of the present invention is to provide a flexible cable having a structural configuration which may be readily fabricated employing known manufacturing techniques. Still another object of the invention is to provide a flexible cable which is mechanically, securely connected at its extremities to signal processing means and to a video sensor and which may be readily accessed and removed in the event of the necessity for replacement or repair of the flexible cable. Yet another object of the invention is to provide a flexible cable which is relatively noncomplex and inexpensive to fabricate, assemble and service.

In general, the present invention contemplates a film video player with an optical axis having signal processing circuitry displaced from the optical axis, a video sensor proximate to but spaced from the signal processing circuitry and movable axially, translationally and rotationally relative to the optical axis and movable relative to the signal processing circuitry and a flexible cable connected to the signal processing circuitry and the video sensor and being coiled at least partially circumferentially about the video sensor for movement with the video sensor without producing a failure by flexure thereof. The flexible cable is elongate and has a plurality of signal carriers interposed between a pair of ground planes, the ground planes including longitudinal strips with longitudinally spaced cross bars, the cross bars of one of the pair of ground planes being longitudinally offset with respect to the cross bars of the other of the pair of ground planes to minimize variations in bending resistance longitudinally of the flexible cable.

PREFERRED EMBODIMENT FOR CARRYING OUT THE INVENTION

Figure 1:
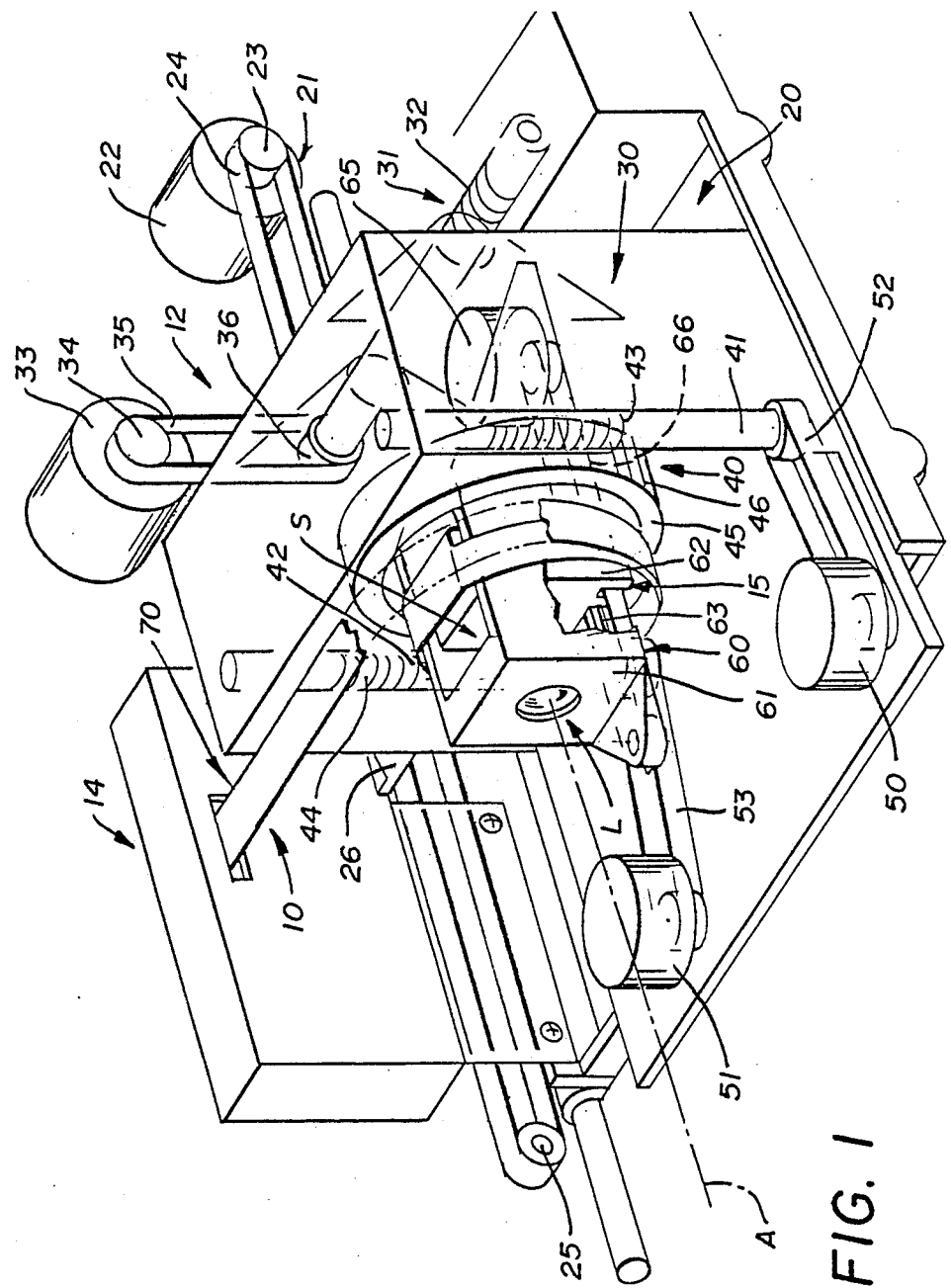
FIG. 1 is a schematic perspective view of a portion of a film video player showing components interrelating with a multilayer flexible cable according to the concepts of the present invention.
Figure 2:
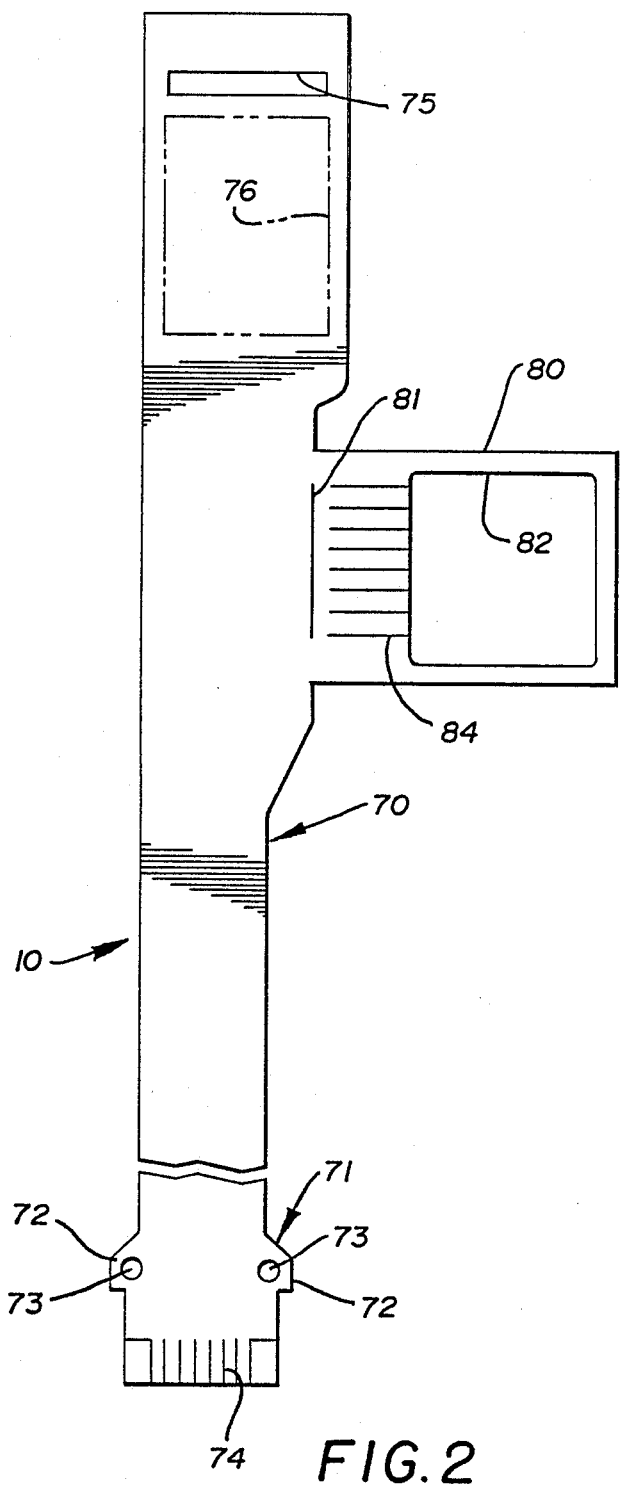
FIG. 2 is an enlarged plan view of the flexible cable in a disassembled planar position.
Figure 3:
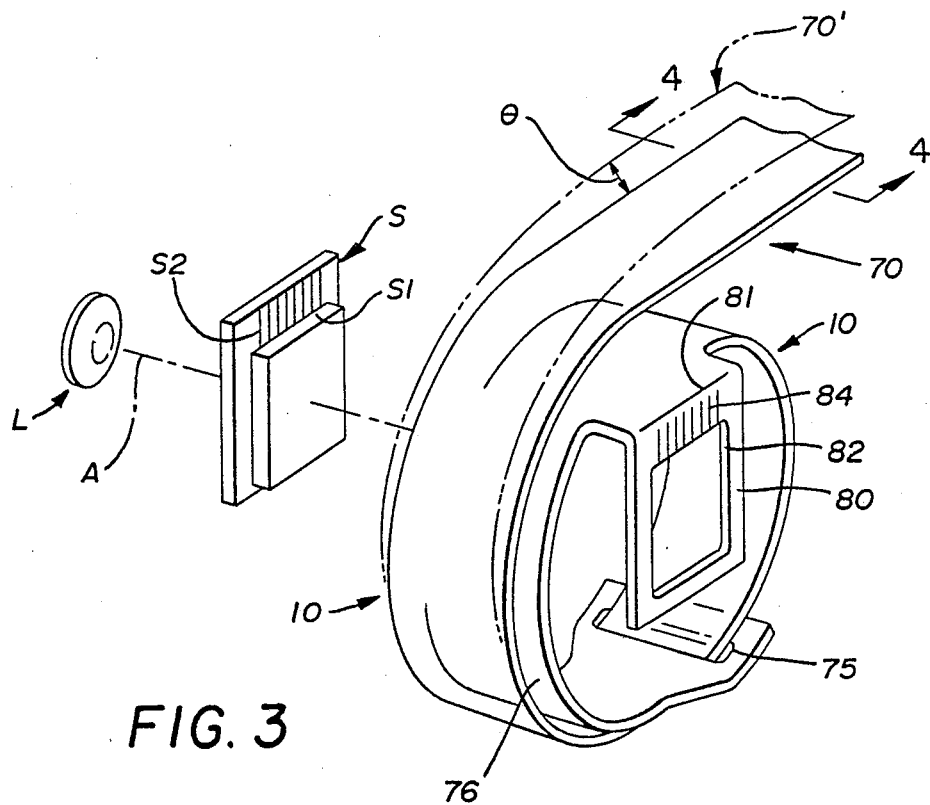
FIG. 3 is an enlarged exploded perspective view depicting the flexible cable in an operative position for interconnection with a video sensor.

An exemplary sensor cable embodying the concepts of the present invention is generally indicated by the numeral 10 in FIGS. 1—3 of the drawings. The cable 10, as shown, is depicted in conjunction with a portion of film video player apparatus, generally indicated by the numeral 12, as schematically depicted in FIG. 1 of the drawings. The film video player 12 depicted is designed for converting film images to video signals which are transferred via the cable 10.

The cable 10 transfers video signals from a video sensor, generally indicated at S, to a signal processing board, generally indicated by the numeral 14, as seen in FIG. 1. The sensor S may be a charged couple device (CCD) of any of various types which are well known in the art and which produce a conventional video signal as an output. Known CCD video sensors produce from an impinging color image a color video signal having a resolution which may equal or exceed standard television resolution. It will be appreciated that other types of video sensors may be employed depending upon the particular functional applications of the film video player 12.

The sensor S is positioned in a sensor mounting block generally indicated by the numeral 15 as seen in FIG. 1. Mounting block 15 carrying the video sensor S is arranged for movement relative to an optical axis A of the film video player 12. Also positioned for movement relative to the optical axis A is a lens, generally indicated at L, which may be of a fixed focal length type. The lens L transmits an image presented to it to the surface of the sensor S.

A photographic image is presented to the lens L by conventional light source optics (not shown) and a film gate (not shown) which are displaced along the optical axis A an appropriate distance to the other side of lens L from the location of the sensor S or to the left as depicted in FIG. 1. Such light source optics conventionally include a lamp which provides a light source for illuminating the film gate. The film gate is illuminated by the light source such that photographic film in the nature of slides or film strips mounted therein are selectively illuminated. It is to be appreciated that one or more film gates may be present in a given film video player 12. It will also be appreciated by persons skilled in the art that the light source optics may include appropriate filters, diffusers, choppers, attenuators, masks and other known processing components such as to provide a light source having intensity and uniformity characteristics sufficient to meet desired operating characteristics of a particular design of film video player 12. It is also to be understood that the lens L is presented with a selected portion of a photographic film image by manipulations of the lens L and associated mechanism as hereinafter described.

The lens L and sensor S are jointly movable axially of the optical axis A by virtue of structural interrelationship with a zoom carriage, generally indicated by the numeral 20 in FIG. 1. The zoom carriage 20 is driven along and selectively precisely located axially of the optical axis A by a zoom carriage drive assembly, generally indicated by the numeral 21. The zoom carriage drive assembly 21 consists of a zoom motor 22 which is preferably a stepper motor of a type which can be advanced by suitable known controls through selected numbers of highly accurate angular increments. The zoom motor 22 is fixedly mounted to a portion of the frame or chassis of the film video player 12. The zoom motor 22 has a shaft which mounts a zoom motor pulley 23. The zoom motor pulley 23 drives a timing belt 24 which engages an idler pulley 25 which is also fixedly attached to the chassis or frame of the film video player 12. The pulleys 23, 25 may have teeth (not shown) which engage mating teeth positioned interiorly of the timing belt 24. Therefore, angular motion of the shaft of zoom motor 22 is translated via the drive pulley 23 to accurate linear travel of the timing belt 24 between the pulleys 23, 25.

The zoom carriage 20 has a belt retaining assembly 26 which attaches to the timing belt 24 for displacing the zoom carriage 20 along the travel of timing belt 24 a portion of the distance between the pulleys 23, 25 thereby moving the zoom carriage 20 including lens L and sensor S axially of the optical axis A of the film video player 12. The zoom carriage 20 also mounts the signal processing board 14 for movement therewith.

The lens L and sensor S are jointly translatable or scannable in one direction in an infinite number of planes perpendicular to optical axis A by virtue of structural interrelationship with a scan carriage, generally indicated by the numeral 30. The scan carriage 30 moves relative to the zoom carriage 20 by virtue of scan carriage drive assembly, generally indicated by the numeral 31. The scan carriage drive assembly 31 has a worm shaft 32 which is mounted on the zoom carriage 20. The scan carriage 31 has a toothed plate (not shown) which engages the worm shaft 32 for moving the scan carriage 30 laterally or horizontally relative to the zoom carriage 20 and the optical axis A. The worm shaft 32 is selectively driven for controlled displacement of the scan carriage 30 by a scan drive motor 33. The scan drive motor 33 may be a stepper motor comparable to the zoom drive motor 22 which can be advanced through selected numbers of highly accurate angular increments. The scan drive motor 33 mounts a drive pulley 34 which carries a timing belt 35 that engages a driven pulley 36 which is nonrotatably affixed to the worm shaft 32. It will thus be appreciated that the scan drive motor 33 may be selectively driven in two directions to affect bidirectional rotation of the worm shaft 32 to position scan carriage 30 in any desired location axially along worm shaft 32 and thus laterally or horizontally relative to the optical axis A.

The lens L and sensor S are jointly translatable or scannable in a direction perpendicular to the direction of movement of scan carriage 30, in this instance vertically, and rotated in an infinite number of planes perpendicular to optical axis A by virtue of structural interrelationship with a gear assembly, generally indicated by the numeral 40 in FIG. 1. The gear assembly 40 has a pair of spaced upstanding worm shafts 41, 42 which are mounted in the scan carriage 30. The worm shafts 41, 42 have helical threads 43, 44 over a substantial portion of their length with both having either right hand or left hand threads.

The gear assembly 40 has interposed between and operatively co-acting with the worm shafts 41, 42 a worm gear 45 which has teeth 46 which engage the threads 43, 44 of each of the worm shafts 41, 42. Since each of the worm shafts 41 and 42 have the same hand helical threads, rotation of each of the worm shafts 41 and 42 at the same angular velocity for the same time period produces a vertical displacement of worm gear 45 a predetermined distance. It is to be understood that such vertical displacement of worm gear 45 would not result in attendant rotation of the worm gear 45. In the event that the worm shafts 41 and 42 are rotated at the same angular velocity for the same time period in opposite directions, the worm gear 45 would remain vertically fixed relative to the worm shafts 41, 42 and thus scan carriage 30, while the worm gear 45 would be rotated. A reversal of the direction of rotation of each of the worm shafts 41, 42 would produce rotation of worm gear 45 in an opposite direction. By thus controlling the direction and extent of rotation of worm shafts 41, 42 a controlled vertical translation distance and bidirectional rotation of worm gear 45 through desired angles may be achieved.

The aforedescribed, directionally independent drive of worm shafts 41, 42 may be effected by a pair of stepper motors 50 and 51 which selectively directionally rotationally drive the worm shafts 41 and 42, respectively. Stepper motors 51 and 52 are mounted on the scan assembly 30 and drive the worm shafts 41, 42 by virtue of interconnecting timing belts 52, 53, respectively.

The worm gear 45 fixedly mounts centrally thereof a lens box assembly generally indicated by the numeral 60. The lens box assembly 60 is a somewhat elongated rectangular structure having a lens support portion 61 which mounts the lens L. Since the sensor S is necessarily positioned at a different axial distance from the lens L for every different position of the zoom carriage 20 reflecting magnification of a film image, sensor S is mounted on a sensor carriage 62 which carries the mounting block 15 for the sensor S. The sensor carriage 62 is movable axially of the lens box assembly 60 by virtue of movement along a support rod 63 mounted on the lens box assembly 60. The sensor carriage 62 is driven by a sensor carriage stepper motor 65 which drives a timing belt 66 that is attached to sensor carriage 62 to move the sensor carriage 62 along the support rod 63 to selectively vary the axial distance between the sensor S and lens L.

The above general description of film video player apparatus 12 is for purposes of depicting a type of system in which a sensor moves axially, translationally in two directions, and rotationally in two directions with respect to the optical axis A of a film video player 12 and with respect to a spatially displaced signal processing board 14 which is mounted on the zoom carriage 20. The structural details and operative interrelationship of a film video player apparatus having these characteristics is disclosed in co-pending application Ser. No. 143,661, for "FILM VIDEO PLAYER APPARATUS", filed of even date.

A variety of signals are transmitted between the sensor S and signal processing board 14 by virtue of the interconnection afforded by the cable 10. The signals involved may include timing and power signals for the sensor as well as an interchange of video and control signals between the sensor and a control system for video film player 12 (not shown) which interfaces with the signal processing board 14.

As seen in reference to FIGS. 1, 2 and 3, the flexible cable 10 has an elongate body portion, generally indicated by the numeral 70. The body portion 70 is preferably of substantially greater length than its width. One end of body portion 70 carries a connecting block, generally indicated by the numeral 71, which may include projecting tabs 72 and apertures 73 for attachment of cable 10 to the signal processing board 14. The connecting block 71 also has a plurality of contacts 74 which matingly engage contacts (not shown) associated with the signal processing board 14. The end of elongate body portion 70 opposite the connecting block 71 may have an elongate slot 75 through which the connecting block 71 may be inserted to effect a looping of the cable 10 as best seen in FIG. 3 of the drawings. A signal processing section 76 of body portion 70 of cable 10 proximate the slot 75 may contain circuitry which effects a degree of signal processing or a sample and hold area for intermittent signal transfer to the signal processing board 14.

The body portion 70 of flexible cable 10 proximate to the signal processing section 76 and slot 75 has a depending tab 80 which may be of a generally rectangular configuration. As best seen in FIG. 3 the tab 80 may have a fold line 81 at which the tab 80 is displaced at an angle of 90° with respect to the plane of body portion 70 of cable 10 proximate thereto. The tab 80 is affixed to the sensor S as by an aperture 82 which interfits with a stepped portion S1 of the sensor S. The rectangular aperture 82 may be sized to effect a pressure mechanical connection or be otherwise attached to stepped portion S1 on the rear of the sensor S so that electrical contacts 84 interengage with electrical contacts S2 which are positioned on the sensor S. The contacts 84 may directly interconnect through body portion 70 with the contacts 74 of connecting block 71 or some or all may interconnect through the signal processing section 76 and thereafter extend through body portion 70 to the contacts 74 of connecting block 71.

As can be visualized by reference to FIGS. 1–3, inclusive, the flexible cable 10 may advantageously be essentially planar as depicted in FIG. 2 in an unstressed condition. In mounting the cable 10 on a video sensor S the tab 80 is pivoted through approximately 90° on fold line 81 to mechanically and electrically interrelate with sensor S as described above. The connecting block 71 and body portion 70 are threaded through the slot 75 such that the body portion 70 assumes a loosely coiled configuration about sensor S and sensor carriage 62 when the sensor is centered on the optical axis A with no rotation or scanning functions applied to the sensor carriage 62 as is depicted in FIG. 3. Alternatively, the extremity of body portion 70 of cable 10 proximate the slot 75 may be attached to the sensor carriage 76 or the sensor mounting block 15 as by a machine screw or other fastener with a slot 75 either being eliminated or with the body portion 70 not looped therethrough. Such a mechanical attachment of the body portion 70 to the sensor carriage 62 is disclosed in co-pending application Ser. No. 143,661, for "FILM VIDEO PLAYER APPARATUS", filed of even date.

With the sensor carriage 62 and therefore sensor S in the position axially closest to the lens L the lateral edges of the body portion 70 of cable 10 preferably lie in parallel planes. The cable 10 is thus in a planar coiled position with no helix angle, substantially as depicted in FIG. 3. As the sensor carriage 62 moves the sensor S away from the lens L to adjust the sensor to lens conjugate in relation to variations in the lens L to film image conjugate, the body portion 70 of the cable 10 assumes a helical configuration as is depicted for exemplary purposes in chain lines at 70' in FIG. 3. Thus positioned by body portion 70 assumes a helix angle $\theta$ which increases as the sensor S moves axially away from the lens L. While the cable 10 might have its planar coil position located other than the closest position between the sensor S and lens L, such is advantageous in terms of imparting an axial and rotational bias to the sensors such that the mounting elements therefor have any mechanical play therein eliminated by virtue of the variable unidirectional biasing provided by body portion 70 in coiling and helically departing from its unstressed condition depicted in FIG. 2.

In addition to the variations in the helical configuration of body portion 70 due to movement of sensor S axially of optical axis A the body portion also reacts to other movements of the sensor S as produced by the mechanical control assemblies moving sensor S as described above. The horizontal scanning effected by scan carriage 30 produces primarily tighter coiling or uncoiling of body portion 70 about the sensor S as well as an extent of flexing of the body portion 70. Vertical translation and rotation of the sensor S produced by gear assembly 40 similarly results primarily in tighter coiling or uncoiling of body portion 70 about sensor S, together with an extent of flexing of the body portion 70. It thus can be seen that the progression of the body portion 70 of cable 10 to various helical configurations, the coiling and uncoiling of body portion 70 about sensor carriage 62 and sensor S, and a limited extent of flexure of body portion 70 enables a design of cable and film video player parameters which can readily accommodate the requisite relative motion between the sensor S and the signal processing board 14.

Figure 5:
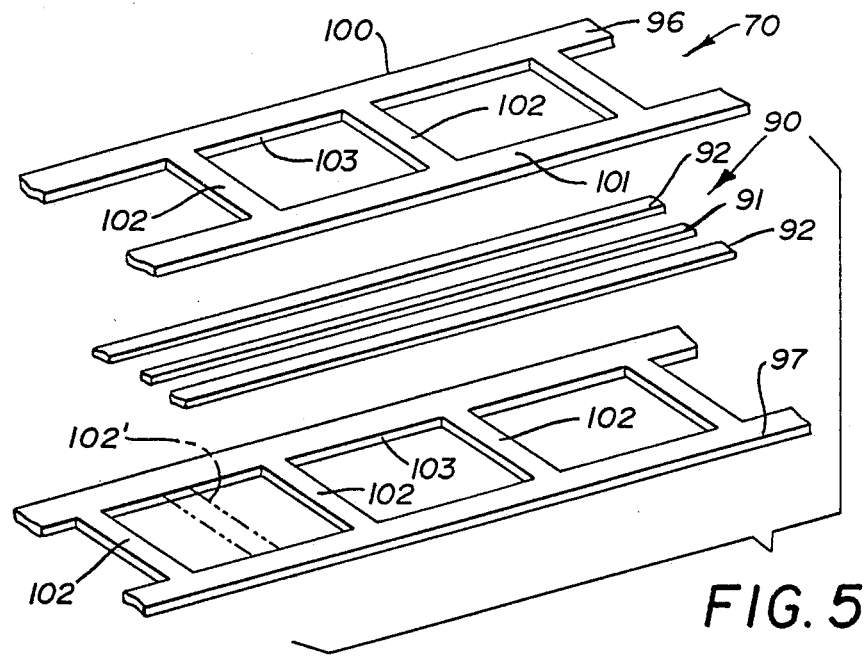
FIG. 5 is an is an exploded fragmentary perspective view depicting details of the shielding layers of an exemplary length of the flexible cable.
Figure 4:
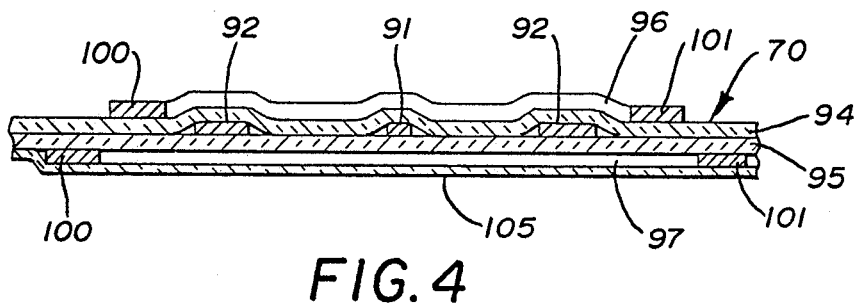
FIG. 4 is a fragmentary cross-sectional view of the flexible cable taken substantially along line 4—4 of FIG. 3.

The construction of flexible cable 10 according to the concepts of the present invention is best seen in FIGS. 4 and 5 of the drawings. The body portion 70 of the cable 10 is designed to provide substantially uniform flexure throughout its length while permitting variations in the configuration to allow such impedance matching with components connected with the signal processing board 14 as may be required. The body portion 70 consists of vertically centrally located signal carrying lines, generally indicated by the numeral 90. As shown the signal carrying lines 90 may consist of a video line 91 and other signal carriers 92, it being understood that more or less lines may be employed depending upon requirements of a particular system. The signal carrying lines 90 are preferably co-planar and laterally spaced across the body portion 70. The signal carrying lines 90 may be of rectangular cross-section as shown with the longer dimension lying within the plane of the signal carrying lines 90 in order to facilitate the necessary flexure of body portion 70. The signal carrying lines 90 are encapsulated between a pair of insulation layers 94, 95 which may be made of any of a variety of materials that are employed for insulation purposes in ribbon cable design, provided that the dielectric strength of the insulation and the adhesive bonding said insulation layers are known and taken into account when determining the impedance of the cable.

Positioned outwardly of each of the insulation layers 94, 95 are substantially planar conductive shield layers or ground planes 96, 97 which are employed for shielding the signal carrying lines 90 from spurious noise and interference. As particularly seen in FIGS. 4 and 5 the ground planes 96, 97 each consist of longitudinal strips 100 on one lateral extremity thereof and longitudinal strips 101 on the other lateral extremity thereof. The longitudinal strips 100, 101 of each of the ground planes 96, 97 are intermittently spaced and joined by cross bars 102 with openings 103 formed in the ground planes 96, 97 therebetween. The area of the openings 103 with respect to the total area of the ground planes 96, 97 may be varied such as to effect the requisite impedance matching of cable 10 as might be required in a particular application. In this manner the size of the signal carrying lines 90 may remain of sufficient undiminished cross-sectional area such as to resist failure upon flexing of cable 10 by exceeding the elastic limit of the materials or a fatigue failure upon repeated flexing.

It is also to be noted that the width or lateral extent of one of ground planes 96, 97 may differ from the other in order that the longitudinal strips 100, 101 are not vertically aligned. Avoiding vertical alignment of the longitudinal strips 100 and 101 prevents possible I-beam resistance to bending which might be occasioned by the alignment of these elements. It will thus be noted that all longitudinally extending elements in body portion 70 are laterally spaced across the width of the body portion as can be appreciated from FIG. 4 of the drawings.

It will also be appreciated that the cross bars 102 of ground plane 96 may be longitudinally offset with respect to the cross bars 102 of the ground plane 97. Thus, with the cable assembled in FIG. 5 a cross bar 102 of ground plane 96 would be positioned at 102' substantially medially between adjacent cross bars 102 of ground plane 97. With this staggered arrangement of cross bars 102 between ground planes 96 and 97 bending resistance of body portion 70 of cable 10 is substantially uniform along the length of cable 10. An insulating cover layer 105 may be provided outwardly of one or both of the ground planes 96, 97.

Thus it should be evident that the video player sensor cable disclosed herein carries out the various objects of the invention set forth hereinabove and otherwise constitutes an advantageous contribution to the art. As will be apparent to persons skilled in the art, modifications can be made to the preferred embodiment disclosed herein without departing from the spirit of the invention, the scope of the invention being limited solely by the scope of the attached claims.

We claim:

1. A film video player having an optical axis comprising: signal processing means displaced from the optical axis, video sensor means proximate to but spaced from said signal processing means and movable axially, translationally and rotationally relative to the optical axis and movable relative to said signal processing means, and flexible cable means connected to said signal processing means and said video sensor means and being coiled at least partially circumferentially about said video sensor means for movement with said video sensor means without producing a failure by flexure thereof.

2. A film video player according to claim 1, wherein said flexible cable means extends at least about substantially the entire periphery of said video sensor means.

3. A film video player according to claim 1, wherein said flexible cable means is more tightly coiled about said video sensor means upon rotation of said video sensor means in one direction and is uncoiled from said video sensor means upon rotation of said video sensor means in the other direction.

4. A film video player according to claim 1, wherein said flexible cable means assumes a helical configuration having increasing helix angles upon movement of said video sensor means in one axial direction and having decreasing helix angles upon movement of said video sensor means in the other axial direction.

5. A film video player according to claim 4, wherein a plurality of mechanical means drive said sensor means axially, translationally and rotationally relative to the optical axis and said helical configuration of said flexible cable means axially and rotationally biases said mechanical means for eliminating mechanical play therein.

6. A film video player according to claim 1, wherein said flexible cable means is more tightly coiled about or uncoiled from said video sensor means upon translation of said video sensor means.

7. A film video player according to claim 1, wherein said flexible cable means has elongate body means and projecting tab means affixed to said sensor means.

8. A film video player according to claim 7, wherein said projecting tab means has an opening which interfits with a portion of said sensor means.

9. A film video player according to claim 8, wherein said flexible cable means has a plurality of signal carrying means and a signal processing section proximate said projecting tab means.

10. A film video player according to claim 8, wherein said elongate body means has a portion which extends beyond said projecting tab means and is substantially restrained relative to said sensor means.

11. A film video player according to claim 10, wherein said elongate body means has a slot proximate said portion which extends beyond said projecting tab means through which said elongate body means is threaded.

12. A film video player having an optical axis comprising: signal processing means displaced from the optical axis, video sensor means proximate to but spaced from said signal processing means and movable axially, translationally and rotationally relative to the optical axis and movable relative to said signal processing means, and elongate flexible cable means connected to said signal processing means and said video sensor means and having a plurality of signal carrying means interposed between a pair of ground plane means, said ground plane means including longitudinal strips with longitudinally spaced cross bars, the cross bars of one of said pair of ground plane means being longitudinally offset with respect to the cross bars of the other of said pair of ground plane means to minimize variations in bending resistance longitudinally of said flexible cable means.

13. A film video player apparatus according to claim 12, wherein said cross bars of said ground plane means are substantially uniformly spaced longitudinally of said flexible cable means.

14. A film video player apparatus according to claim 12, wherein each of said ground plane means are substantially planar.

15. A film video player apparatus according to claim 14, wherein said signal carrying means are co-planar.

16. A film video player apparatus according to claim 15, wherein the plane of said signal carrying means and said ground plane means are mutually parallel.

17. A film video player apparatus according to claim 12, wherein one of said pair of ground planes is of greater lateral width than the other of said pair of ground plane means, whereby said longitudinal strips of said pair of ground plane means are not vertically aligned.

18. A film video player apparatus according to claim 17, wherein said signal carrying means are not vertically aligned with any of said longitudinal strips of said ground plane means.

* * * * *